Oct. 10, 1967 G. NATHAN 3,345,769

TELEPHONE CARD INDEX FOR A PUSH BUTTON DIAL TELEPHONE

Filed Oct. 24, 1965

INVENTOR
GERD NATHAN

BY I. William Millen
ATTORNEY

United States Patent Office 3,345,769

Patented Oct. 10, 1967

3,345,769

TELEPHONE CARD INDEX FOR A PUSH BUTTON DIAL TELEPHONE

Gerd Nathan, Springfield, Va., assignor to Nathan Industries, Inc., Springfield, Va.

Filed Oct. 24, 1965, Ser. No. 504,456
15 Claims. (Cl. 40—336)

This invention relates in general to a telephone card index holder for a push button dial telephone and more specifically, to a card index holder which may be either integral with and form part of the telephone or merely be attached thereto over the push button dial.

Holders for alphabetical card indexes of names and telephone numbers have conventionally been attached to circular dial telephones with brackets, clamps, screws, and the like. In such a case, the holder is usually secured directly to the circular dial switch on the face of the telephone and the index cards are secured to the holder with binder rings or removable screws which are inserted through the index cards. The circular dial switch to which the card holders were affixed has been replaced on newer telephones by a push button dial, and hence it is now desirable to provide an index card holder which can be readily attached to the face of the telephone over the push button dial switch. Moreover, there is also a need for a card index holder into which alphabetical index cards can be readily inserted and secured therein without resort to a movable mechanical binder and the like. Alternatively, it is also desirable to provide a card index holder which can replace the plate over the push button dial and thus form one face of the telephone.

It is therefore a principal object of this invention to provide an improved card index holder for a push button dial telephone which can be readily secured thereto.

It is another object of this invention to provide a card index holder in the form of a cover plate over the push button dial of a telephone.

It is yet another object of this invention to provide for a push button dial telephone a combination cover plate and card index holder into which alphabetical index cards can be inserted and fixedly secured therein without a movable fastener.

It is still another object of this invention to provide an improved card index holder which can be readily inserted over the push button dial of a telephone and in juxtaposition with the outer face thereof.

Yet another object of this invention is to provide an improved card index holder which is attachable onto the push button dial of a telephone and which contains a card holder into which index cards can be inserted and fixedly secured without a movable fastener.

Other objects and advantages of the invention will become apparent by referring to the following description and claims, taken in conjunction with the accompanying drawings in which:

Figures 1, 2, 3, 4, 5:
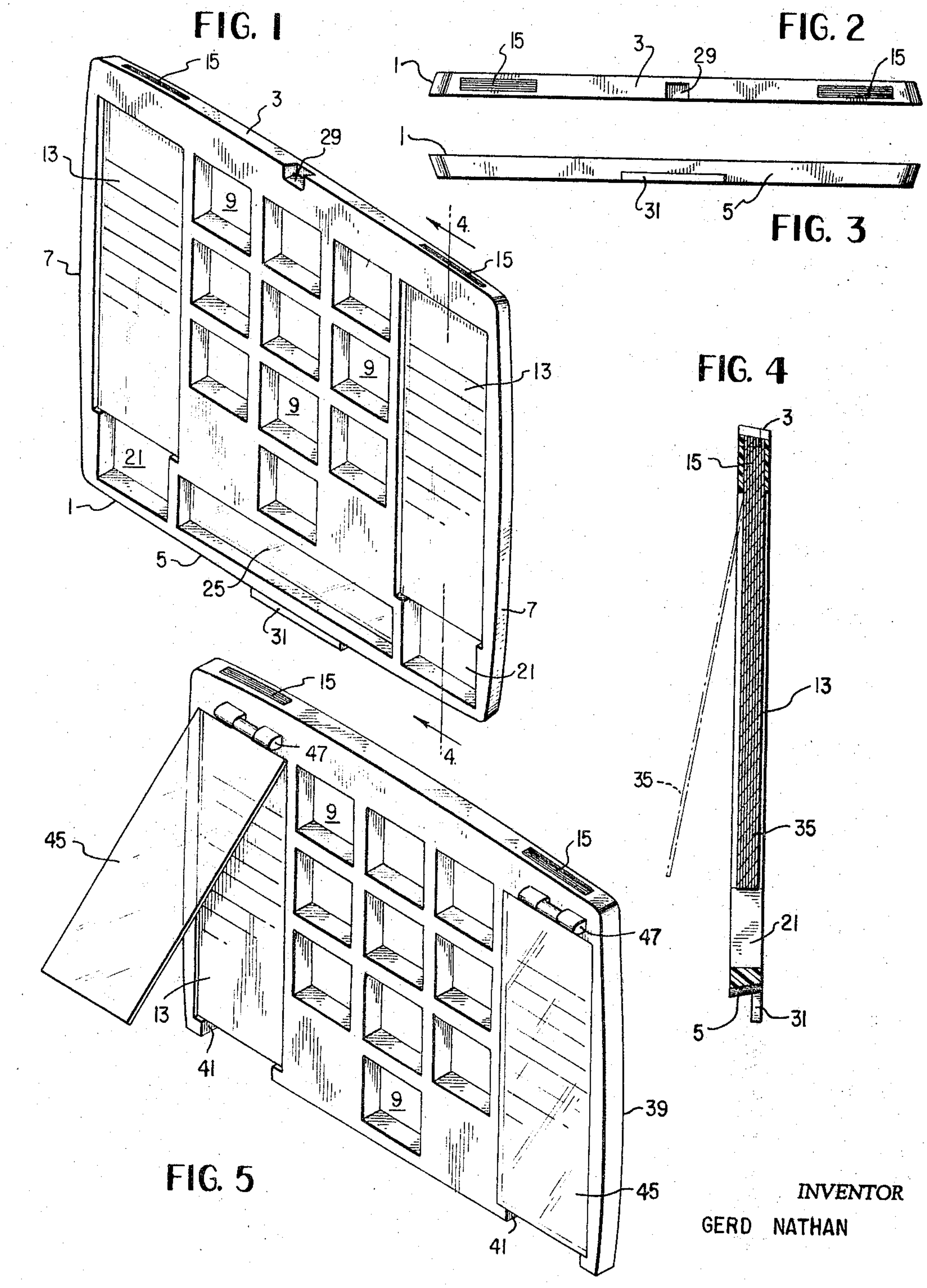
FIGURE 1 is a perspective view of a combination cover plate and card index holder which forms the front face of a telephone over the push button dial thereon.
FIGURE 2 is a top view of the end of the combination cover plate and card index holder of FIGURE 1, and particularly illustrating the position of the locking indentation therein.
FIGURE 3 is a view of the bottom end of the combination cover plate and card index holder of FIGURE 1, showing the position of the tongue protruding from the bottom end thereof.

FIGURE 4 represents a sectional side view through lines 4—4 of FIGURE 1 which depicts the position of slits in the upper end of the plate into which portions of the card are inserted; and FIGURE 5 is a perspective view of a card index holder to be inserted over a cover plate of the push button dial of a telephone, showing especially the hinged closures overlying the compartments into which alphabetical index cards are stored.

It is to be understood that the above drawings are exemplary only of but several embodiments of the invention and that changes and modifications may be made within the skill of the art without departing from the spirit of the invention.

The combination telephone cover plate and card index holder is shown generally at 1 with an upper end 3, lower end 5, and sides 7. Fenestrations or apertures 9 are formed in the plate to register with the positions of telephone dial push buttons, thereby providing openings therein through which the push buttons protrude when the plate 1 is mounted and forms the front of the telephone. The cover plate 1 is shown in FIGURE 1 as being planar and generally rectangular in order to facilitate the description thereof. However, the cover plate 1 may be of any desired shape and the contour thereof can correspond to that desired for the front face of the telephone over the push button dial.

A pair of two-ended elongated card slots 13 whose longitudinal axis lies generally parallel to sides 7, are positioned adjacent the area containing the fenestrations through which the push button dials are inserted. The slots 13 can be either a groove cutting completely through the plate, or else, shallow recesses formed in the front face of the plate 1. A slot or slit 15 formed in the plate between the front and back face thereof opens into the upper ends of the slots 13; the slits 15 into which a prortuding edge of the index card is inserted can extend to the upper end 3, or else, they may extend only partway into the plate and thus form a recess opening into the slot 13.

Index card gripping slots 21 coextensive and communicating with the lower end of card slots 13 are formed in plate 1 to permit cards stored in the holder to be turned or flipped. Although the gripping slots 21 are shown here as extending completely through the plate, they can conveniently be formed from depressions or recesses in the surface of the plate which communicate with the lower end of slots 13.

There is further provided in the card holder 1 a recessed telephone-identification area 25 lying below the area of the plate containing apertures 9 and intermediate the index card gripping slots 21. Into the recess 25, which can also be above the fenestrated area, a card bearing a number of the telephone to which the plate is attached is inserted. If desired, a transparent window may also be placed over the recessed area 25 as a protective shield.

A recess or indentation 29 is provided on the upper end 3 of plate 1, as shown in FIGURES 1 and 2. Into locking recess 29 is seated a lug protruding from the telephone onto which the plate 1 is mounted. A locking lug or tongue 31 protruding from the lower end 5 of the plate is adapted to seat in a recess formed in the telephone. Thus, locking recess 29 and tongue 31 cooperate with corresponding lugs and recesses in the telephone to fixedly attach the plate 1 thereto when it is mounted on the telephone with the dial push buttons exending through fenestrations 9. The tongue 31, shown in FIGURES 1 and 3, can be of any desired shape corresponding to the shape of the recess provided in the telephone body. It is also within the contemplation of the invention to utilize other, similar means to lock and affix the plate to the telephone.

Referring now to FIGURE 4, a section along line 4—4 of FIGURE 1, a plurality of alphabetical index cards 35 are shown stacked in slot 13. One end of the cards 35 are shown extending into slit 15 wherein they are held in friction-locking engagement. Thus, it is necessary to provide on the one edge of the cards 35, a projecting portion sized to slide into slit 15 and to engage the sides thereof in friction-locking engagement.

It is the particular size of slit 15 and the associated cards which fit therein which fixedly secure the cards to the holder and obviates the need for binders and other similar mechanical attachments having movable parts. The card 35, in dotted section, is shown raised from the stacked cards to illustrate the way cards are lifted without removing the same from the holder. It can also be seen in FIGURE 4 that slots 21 provide an opening for gripping the lower ends of the cards when it is desired to raise or lift them. Thus, it can be seen that the combination cover plate and card index holder shown in FIGURES 1 to 4 can replace a conventional plate covering the telephone dial push button switching mechanism and advantageously provide a new and novel card index holder integral therewith.

In yet another embodiment of the invention, shown in FIGURE 5, a card index holder, generally indicated at 39, is designed to slide onto the telephone dial push buttons and in juxtaposition with the cover face of the telephone. As was the case with the cover plate index card holder 1, the card index holder 39 has the same general fenestrations 9 which register with the position of the telephone dial push buttons, card slots 13 and slits 15 communicating with the upper end of slots 13. Card gripping slots are omitted since the upper face of the holder 39 lies above and superadjacent to the face plate of the telephone, and the lower end of the cards can therefore be conveniently gripped. In place of the gripping slots 21 provided in the cover plate of FIGURE 1, the holder 39 employs a groove or channel 41 formed in the lower end of the holder which communicates with the lower end of slots 13. Closures 45 for each of slots 13 are provided as a protective cover therefor. The closures 45 are secured to the front face of holder 39 with hinges 47 which permit the closure to be raised to obtain access to the index cards stored in slots 13.

To operatively mount card index holder 39 to a telephone having a push button dial, the holder is simply mounted in juxtaposition to the front face of the telephone in such a manner that the push buttons protrude through fenestrations 39 and thereby lock or secure the holder onto the front face of the telephone. The cards employed in holder 39 are provided with a projecting portion which similarly slides in friction engagement with the edges of slits 15, thereby locking the same to the holder.

The cover plates and card index holders of this invention may be either cut or molded from metal or suitable synthetic resins, such as methyl methacrylate, polyvinyl chloride, Bakelite, polyvinyl acetate, polymethacrylates, phenol formaldehyde resins, etc. It is often desirable to select a synthetic resin which is readily moldable into the desired shape and which has a high resistance to surface abrasion. If desired, various pigments can also be incorporated into the synthetic resins to provide more pleasing appearance.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A combination cover plate and telephone index card holder for a telephone having a push button dial comprising: a telephone cover plate with a front and back face and having fenestrations therein registering with positions of the dial push buttons, thereby permitting the same to extend through the plate when it is operatively seated and forms an integral part of the telephone, said plate having slots therein spaced from said apertures, index cards sized to be received in the slots, index card locking means positioned adjacent the slots to receive in friction-locking engagement projecting portions of the index cards, and index card gripping means on the front of the plate adjacent the slots to permit the index cards therein to be readily lifted from the slot.

2. The combination cover plate and telephone index card holder of claim 1, further characterized by having locking means on the cover plate to fixedly attach the same to the telephone when the cover plate is inserted thereon and the push buttons extend through the fenestrations.

3. The combination cover plate and telephone index card holder of claim 1 wherein the fenestrations into which the push buttons are inserted are clustered in a central area of the plate, and said slots lies in parallel alignment on opposite sides of the fenestrated area.

4. The combination cover plate and telephone index card holder of claim 3 wherein the card locking means is a slit formed in the plate between the front and back face thereof and which opens on one edge of the slot to receive in friction-locking engagement a projecting portion of the index cards.

5. The combination cover plate and telephone index card holder of claim 4 wherein the index cards are sized to fit in the slot in between the front and back face of the plate when the projecting portion of the card is inserted into the slit.

6. The combination cover plate and telephone index card holder of claim 1 wherein the fenestrations receiving the push buttons are centrally clustered in the plate and the slots are elongated two-ended recesses in the face of the plate on either side of the fenestrated area, and the card locking means is positioned adjacent the recesses on one end thereof.

7. The combination cover plate and telephone index card holder of claim 6 wherein the card locking means is a slit formed in the plate between the front and back face thereof and which opens on one of the two ends of the elongated recess, thereby to receive in friction-locking engagement a projecting portion of the index cards.

8. The combination cover plate and telephone index card holder of claim 7 wheerin an index card gripping means is a groove in the face of the plate which communicates with the other of the two ends of the recess.

9. The combination cover plate and telephone index card holder of claim 7 wherein the index cards having a projecting portion are sized to fit in the elongated recesses between the front and back face of the plate when the projecting portion of the card is inserted into the slit.

10. The combination cover plate and telephone index card holder for a telephone having a push button dial comprising: a telephone cover plate with two sides extending between an upper and lower end and a front and back face, said plate having an area with apertures extending through the plate which register with the dial push buttons, thereby permitting the same to extend through the apertures in the plate when it is operatively seated on the telephone, elongated two-ended card slots positioned laterally to the apertured area and parallel to the sides of the plate, thereby to provide a compartment in the plate for index cards, index card locking means on one of the two ends of the slots to receive in locking engagement projections on the index cards, and index card gripping slots formed in the face of the plate which are coextensive and communicate with the other of the two ends of the card slots.

11. The combination cover plate and telephone index card holder of claim 10, further characterized by having below the apertured area a recess into which is inserted a card bearing a number corresponding to that designated for the telephone to which the plate is attached.

12. The combination cover plate and telephone index card holder of claim 11, further characterized by having on the upper and lower side of the plate a plate locking means, thereby to lock the same to the telephone when the plate is mounted thereon and the push buttons extend through the apertures in the plate.

13. A combination cover plate and telephone index card holder which forms one face of a telephone and covers a push button dial switch comprising: a telephone cover plate with two sides extending between an upper and lower end and a front and back face, the plate having an area with a plurality of apertures extending through the plate which register with the dial push buttons, thereby permitting the same to extend through the plate when it is operatively seated on and forms an integral part of the telephone, elongated upper and lower ended card slots whose longitudinal axis lies parallel to the sides of the plate and which are positioned laterally to and on either of the two sides of the apertured area, thereby to provide a compartment in the plate between the front and back faces thereof for index cards, slits formed in the plate between the front and back face thereof which open on the upper end of the slots to receive in friction-locking engagement projecting portions of index cards, index card gripping slots formed in the face of the plate which are coextensive and communicate with the lower end of the card slots, a recessed telephone-identification area below the apertured area and intermediate the index card gripping slots, thereby to provide a recess into which a telephone-identification card can be inserted which bears a number corresponding to that designated for the telephone onto which the plate is mounted, a transparent protective cover over the recessed telephone-identification area, a locking indentation in the upper end of the plate designed to receive a lug projecting from the telephone, and a locking tongue protruding from the lower end of the plate which is to be received in a recess of the telephone, the locking indentation and locking tongue cooperating to fixedly secure the plate to the telephone when it is mounted thereon and the push buttons extend through the apertures.

14. A card index holder to be attached over a dial on a push button dial telephone, said holder comprising a plate with a front and back face and having apertures therein registering with the positions of the dial push buttons, thereby permitting the buttons to extend through the plate when it is operatively seated over the dial, said plate having elongated parallel slots therein spaced from said apertures, index cards sized to be received in said slots, index card locking means positioned adjacent the slots to receive in friction-locking engagement projecting portions of the index cards, and a hinged closure over the slots on the front face of the plate.

15. A card index holder to be attached over a dial on a push button dial telephone, said holder comprising a plate with two sides extending between an upper and lower end and a front and back face, said plate having an area with a plurality of apertures extending through the plate which register with the dial push buttons, thereby permitting the buttons to extend through the plate when it is operatively seated over the dial, elongated upper and lower ended card slots whose longitudinal axes lie parallel to the sides of the plate, and which are positioned laterally to and on either of the two sides of the apertured area, thereby to provide a compartment in the plate between the front and back faces thereof for index cards, slits formed in the plate between the front and back faces thereof which open on the upper end of the slots to receive in friction-locking engagement projecting portions of index cards, a gripping channel communicating with the lower end of the plate and the lower end of the card slots, and transparent protective covers over the slots which are hinged to the front face of the plate.

References Cited

UNITED STATES PATENTS

| | | | |
|---|---|---|---|
| 2,757,022 | 7/1956 | Young | 281—15 |
| 3,063,183 | 11/1962 | Long | 40—336 |

EUGENE R. CAPOZIO, *Primary Examiner.*

W. GREIB, *Assistant Examiner.*